Patented Aug. 9, 1932

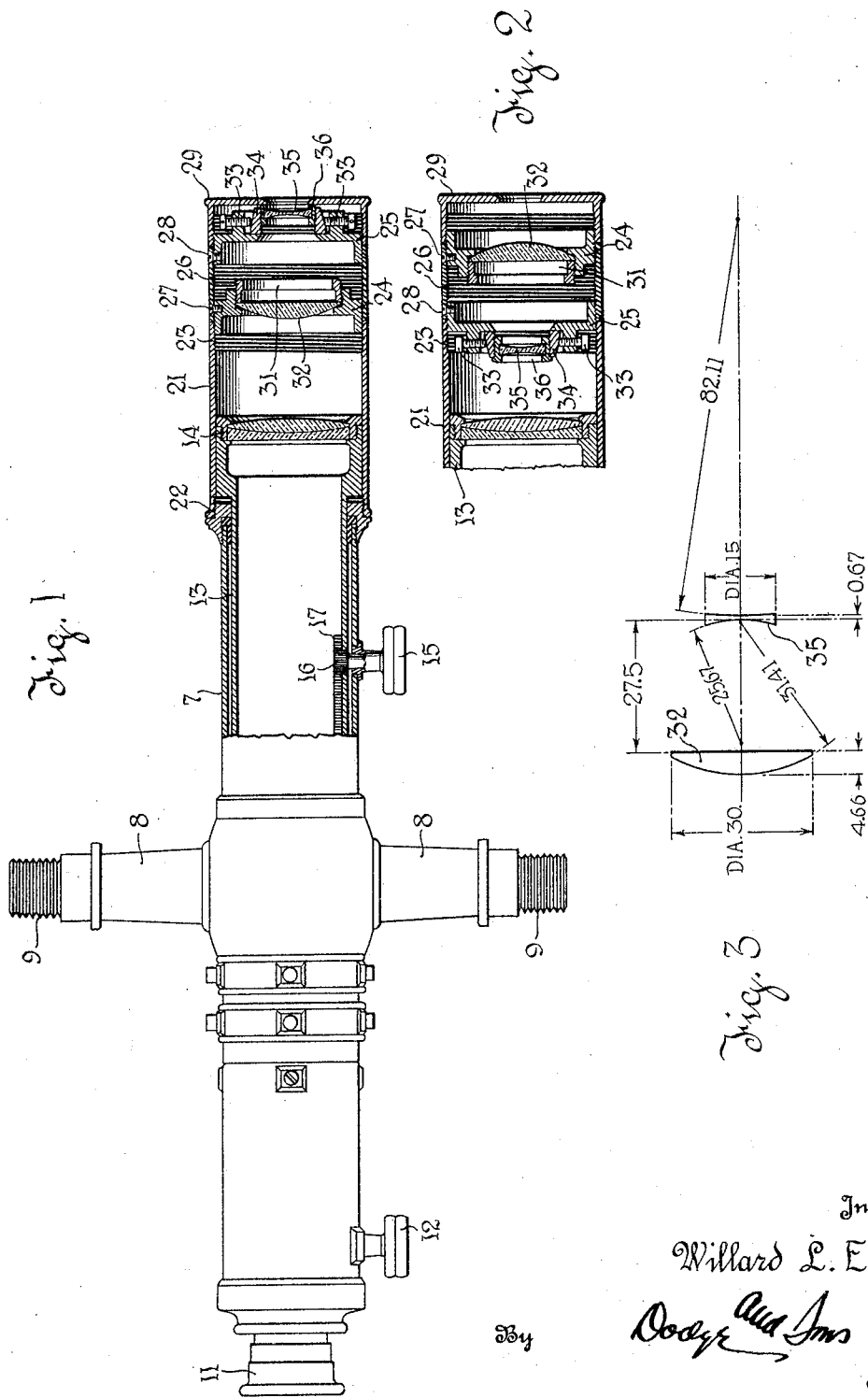

1,871,165

UNITED STATES PATENT OFFICE

WILLARD L. EGY, OF TROY, NEW YORK, ASSIGNOR TO W. & L. E. GURLEY, OF TROY, NEW YORK, A CORPORATION OF NEW YORK

SURVEYING INSTRUMENT

Application filed February 5, 1930. Serial No. 426,133.

This invention relates to optical instruments and particularly to a short focus attachment for surveying instruments.

All telescopes used in surveying instruments are provided with a focusing movement so that infinitely distant objects, such as stars, and also near objects, may alternatively be brought into sharp focus. This focusing movement may be of either of two types, i. e., that in which the objective is moved relatively to the eye-piece toward and from the object to be observed, or, that in which a special focusing lens of either positive or negative focal length is moved within the interior of the telescope tube in the direction of the axis of that tube.

In the first type of focusing arrangement the overall length of the telescope is variable, while in the second, it is constant. The first is commonly preferred, because of its better illumination and its better correction for color and aberrations, but, so far as the present invention is concerned, it is immaterial which of the two telescope types is used. The available ranges for focusing in both types are approximately the same.

The range of near objects to be brought in focus is limited by the fact that the closer the object the greater the amount of focusing movement necessary. It is impracticable to use very large focusing movements because where a large focusing movement is used the balance of the telescope on the trunnions is affected and the ability to swing the telescope through is also affected.

The amount of focusing movement is expressed by the equation—

Focusing movement for Distance D $$F.M_D = \frac{F^2}{D-F}$$

where D is the distance to the near object measured from the lens to be focused and F is the equivalent focus of the objective. Thus where the objective has an equivalent focus of 10 inches a focal movement of 1.82 inches is necessary to focus at a distance of 60 inches. This explains why most surveying instruments will focus on objects not closer than 5 or 6 feet.

In many classes of surveying, notably, in mine and tunnel work and in interior surveying, it is necessary to focus on objects at distances materially less than 60 inches. For example, sights at 24 inches or less are not unknown. Heretofore it has been proposed to secure a short focus by mounting one or two auxiliary positive lenses on the objective end of the telescope. Where this is done provision must be made to insure that the line of collimation is correct both with and without the auxiliary lenses.

This requirement introduces serious difficulties, particularly when the fact is considered that successive sights must often be taken at alternate distances of the order of 3 feet and 75 feet. To do this, an attachment such as just described must be put on the telescope and removed repeatedly. This means that maintained accuracy is difficult and that indeterminate errors are likely to be introduced upon any particular application of the attachment.

Furthermore, the attachment, such as just described, is not suitable for telescopes of different lengths.

There are many other defects notoriously present in attachments of the type just mentioned. They affect adversely the corrections of the telescope itself. They increase the magnifications to a degree which is not appropriate for observing fine wires at a close distance. If they are used to observe a graduated bar the divisions appear too large and only a very small part of the bar is visible in the telescope when the attachment is in place. It follows that numerals may be outside the field of view with the result that errors in reading are commonly made.

Another very serious defect of the prior art attachments is that the auxiliary focusing lens makes the stadia wires practically useless. To use the stadia wires it is necessary to introduce an inconvenient constant, dependent on the optical characteristic of the attachment.

The present invention overcomes the above defects. Generally stated, it consists in using a Galilean telescope, preferably two-power, in front of the objective of the surveying telescope and so focused that rays which enter parallel leave parallel. For short focus work the negative lens of the Galilean telescope faces the object to be sighted. With such an attachment the near distance on which the combined instrument may be focused is reduced in inverse proportion to the square of the power of the attachment. Thus, with a two power system, such as suggested, the focusing distance of the telescope proper is reduced to one-fourth. Thus a telescope which without the attachment focuses at a minimum distance of 60 inches will focus with the attachment at a minimum distance of 15 inches.

With the attachment the field is increased twice and the power is reduced one-half, so that small targets at short distances are not unduly magnified. Because of the increase of field the danger of misreading a graduation is greatly reduced, if not eliminated, this for the reason that a larger portion of the scale is visible and the numerals can be seen normally through the telescope.

The ordinary stadia constant of 100 is transformed into a new constant of 50, so that the stadia principle may be used with a simple mental computation.

It is possible so to design the Galilean telescope that the correction of the main telescope is not affected.

The attachment is not limited to use with telescopes of any particular length nor telescopes of a special optical design, but the same attachment will operate satisfactorily with telescopes of different lengths and different optical constructions.

Another incidental advantage of the arrangement proposed is that the Galilean telescope may be reversed, that is, mounted with the positive lens facing the object, in which case the power of the surveying telescope is doubled, the field is reduced, and a new stadia constant is secured, namely, 200. This again is a simple multiple of the normal 100 ratio, so that the stadia principle may be used with a simple mental computation.

The best embodiment of the invention known to me is illustrated in the accompanying drawing, in which, Fig. 1 is a view, partly in plan and partly in axial section, of an ordinary surveyor's telescope, with the short focus attachment applied.

Fig. 2 is a fragmentary view of the attachment showing the lenses assembled in a reverse relation.

Fig. 3 is a dimensioned diagram showing one example of the optics for the short focus attachment giving the simplest and best solution of the problem known to me.

In Fig. 1, 7 represents the tube of an ordinary surveyor's telescope having the trunnions 8 and the trunnion journals 9, all of ordinary form. 11 is the eye-piece. 12 is the knurled wheel for focusing on the cross hairs. 13 is the main focusing tube which carries the objective 14. The longitudinal motion of the tube is effected by turning the knurled wheel 15 which is fast to the pinion 16 meshing with the rack 17.

This is a familiar focusing arrangement of the first type above mentioned. For practical reasons the range of motion of the tube 13 relatively to the tube 7 is limited to something less than 2 inches, with the consequence that even in small telescopes the minimum focus is of the order of 60 inches. When the instrument is to be used for shorter focus work the attachment now to be described is applied to the objective end of the surveying telescope, and because of its optical characteristics need not be removed even for long sights.

The short focus attachment is mounted on a tubular extension 21 which is threaded at 22 to the objective end of the telescope, this being the common manner of mounting short focus attachments. The tube 21 is large enough to encircle the objective-carrying outer end of the tube 13 and permits free focusing motion of this. At its forward end tube 21 is internally threaded, as indicated at 23, and screws on to the projecting externally threaded end to a lens mount 24. This lens mount 24 is properly spaced with reference to a second lens mount 25 by means of an internally threaded tube 26. When the mounts are properly spaced they are fixed in position by small screws 27 and 28. Both of the lens mounts 24 and 25 are threaded into the interior of the tube 26 and both have threaded portions projecting beyond its ends. Threaded on to the projecting threaded portion of the lens mount 25 is an apertured end cap 29.

Mounted in the lens mount 24 and retained in position by the threaded collet 31, is the positive lens 32 of the Galilean telescope. The lens mount 25 is provided with a flange, clearly shown in the drawing, which receives four radially arranged capstan screws 33. These screws are opposed to each other in pairs and serve to center in the mount 25 a secondary mount 34 which carries the negative lens 35 of the Galilean telescope. The lens 35 is mounted in a ring 36 threaded into the secondary mount 34. The purpose of the capstan screw arrangement is to allow accurate centering of the negative lens. If accurate centering can be otherwise secured such an adjustment is not necessary.

The purpose in using a tubular portion 26 separate from the extension tube 21, is to permit the Galilean telescope to be reversed. The reversed position is shown in Fig. 2. Where such reversal is unnecessary or undesired, the tube 26 may be made integral with the tube 21. The reversal is made merely by unscrewing the cap 29 and unscrewing the tube 26 with its connected lens mount from the tube 21. The tube 26 with the lenses is then turned end for end and screwed into place, as indicated in Fig. 2. The attachment arranged as in Fig. 2 will only occasionally be used, but the ability to use it on occasion is valuable. The attachment assembled as shown in Fig. 1 will be used in all cases where it is necessary to take sights of less than the minimum focal adjustment of the main telescope, that is to say, about five feet and under.

It is important to observe that it is not necessary to remove the attachment to take long sights so that in mine and similar surveying it is possible to proceed throughout the survey with the short focus attachment in place. This avoids the introduction of indeterminate errors, and is a feature of the utmost importance.

It will be observed that the invention is characterized by the use of a Galilean telescope, and preferably one of two-power. The selection of the power, aside from the desirable optical characteristics introduced, is controlling on the use of the simple correction factor when stadia readings are made.

It is desirable that the attachment be corrected for color, and that it be of the simplest optical construction. It is entirely practicable to secure the desired power and a high degree of correction without the use of double or cemented lenses. To illustrate the simplest lens system known to me to accomplish the desired purpose, and without limiting myself thereto, I give the following specific example illustrated in Fig. 3.

This involves the choice of particular indices, dispersions and focal lengths. The lenses are peculiarly economical to manufacture because only three radii must be ground, the second surface of the positive lens being plano. It is not necessary that the objective be a plano-convex lens, but if the form of this lens be modified, corresponding modifications must be made in the negative lens. One ratio must remain constant to insure that the color correction of the system is satisfactory. This constant ratio is the dispersion of the crown divided by the dispersion of the flint, and in this case is equal to the power of the attachment, which is two. The following notation will be used.

$r_1, r_2, r_3, r_4$ denote the first, second, third and fourth radii which are positive when facing the light, assumed for the purpose of diagram, to travel from left to right.

$d_1$ is the thickness of the first lens.
$d_2$ is the thickness of the second lens.
$\Delta$ is the separation or inteval between lenses.
$n_D$ is the refractive index for the D-line (sodium light).
$\mu$ is the dispersive reciprocal, that is to say, $$\nu = \frac{n_D - 1}{n_F - n_C}$$

(where $n_F$ is the index for Green F-line) and $n_C$ the index for Red (C-line).

On Fig. 3 and in the following tabulation, the linear dimensions are expressed in millimeters.

For the positive lens 32 we have the following dimensions—(crown glass)

$r_1 = +31.42$
$r_2 = a$
$d_1 = 4.66$
$n_D = 1.5171$
$\nu = 66.4$
Dia. = 30

For lens 35—(flint glass)

$r_3 = -25.67$
$r_4 = +82.11$
$d_2 = 0.67$
$n_D = 1.6489$
$\nu = 33.2$
Dia. = 15

The two lenses dimensioned as above described are so spaced that $\Delta = 27.50$.

The diameter of the objective of the Galilean telescope, that is, the diameter of the lens 32, is chosen to be the same or approximately the same size as the objective lens of the surveying telescope. Consequently the attachment dimensioned as illustrated in Fig. 3 is intended for use with a surveying telescope having an objective of 30 millimeters. If the attachment so dimensioned were used on a telescope having a larger objective it would cut down the illumination by reducing the exit pupil.

To develop attachments for surveying telescopes having larger or smaller objectives the dimensions given in the numerical example, may be multiplied by appropriate factors, and so developed would retain the characteristics of power, field and correction.

The system as described is corrected in itself for the whole aperture for parallel rays. When it is used with a well corrected surveyor's telescope the image qualities of the latter are not adversely affected. In correcting the system the theory is to reduce the zonal errors to a minimum. That they are very slight is obvious from the following table:

Ray incident at $h = 15 + 0'\ 15''$ overcorrected,

Ray incident at $h = 15\sqrt{\frac{2}{3}} + 0'\ 01''$ overcorrected,

Ray incident at $h = 15\sqrt{\frac{1}{3}} - 0'\ 03''$ undercorrected.

What is claimed is,—

1. An attachment for use in front of the objective lens of a surveyor's telescope to modify the focusing characteristic thereof, comprising a Galilean telescope consisting of two single uncemented elements, one of which is positive, and the other negative, the former having a focal length and a dispersion value which are, respectively, twice the focal length and the dispersion value of the second.

2. An attachment for use in front of the objective lens of a surveyor's telescope to modify the focusing characteristic thereof, comprising a Galilean telescope consisting of two single uncemented elements, one of which is plano-convex, and the other bi-concave, the former having a focal length and a dispersion value which are, respectively, twice the focal length and the dispersion value of the second.

3. An attachment for use in front of the objective lens of a surveyor's telescope to modify the focusing characteristic thereof, comprising a telescope made of two single uncemented fixedly mounted elements, one positive and composed of crown glass, and the other negative and composed of flint glass, the radii, the interval between lenses and the dispersion values being so selected that the Galilean telescope is substantially corrected for color and spherical aberration over the whole aperture.

4. An attachment for use in front of the objective lens of a surveyor's telescope to modify the focusing characteristic thereof, comprising a telescope made of two single uncemented fixedly mounted elements, one positive and composed of crown glass, and the other negative and composed of flint glass, the radii, the interval between lenses and the dispersion values being so selected that the Galilean telescope has a power of two and is substantially corrected for color and spherical aberration over the whole aperture.

5. An attachment for use in front of the objective lens of an adjustable focus surveyor's telescope having stadia wires in the focal plane of the lens system, comprising a Gallilean telescope having a fixed adjustment capable of modifying the focal length of such lens system, and changing the stadia constant in a simple ratio.

6. An attachment for use in front of the objective lens of an adjustable focus surveyor's telescope, comprising a Gallilean telescope having a fixed setting such that rays which enter parallel leave parallel, said attachment serving to increase the field, reduce the power and reduce the minimum focusing distance of the telescope to which it is attached.

7. An attachment for use in front of the objective lens of an adjustable focus surveyor's telescope, comprising a Gallilean telescope having a fixed setting such that rays which enter parallel leave parallel, said attachment in conjunction with the surveyor's telescope, serving to increase the field of the surveyor's telescope, reduce its power to one-half of its normal value, and reduce its minimum focusing distance to one-fourth of its normal value.

8. An attachment for use in front of the objective lens of an adjustable focus surveyor's telescope, comprising a Gallilean telescope having a fixed setting such that rays which enter parallel leave parallel, said attachment having a power of two, and comprising two single uncemented elements, one of which is positive and the other of which is negative, the positive element having a focal length and a dispersion value which are respectively twice the focal length and dispersion value of the negative element.

9. The combination of an adjustable focus surveyor's telescope and a short focus attachment removably mounted in front of the objective lens of the surveyor's telescope, and comprising a Galilean telescope having a fixed setting such that rays entering parallel leave parallel, said attachment serving to reduce the power of the surveyor's telescope and the minimum focusing distance thereof while permitting the surveyor's telescope to be focused on distant objects with the attachment in place.

10. As a new article of manufacture, a reversible attachment for use in front of the objective lens of an adjustable focus surveyor's telescope having stadia wires in the focal plane of its lens system, said attachment comprising a Galilean telescope having a mount which is capable of being attached to the surveyor's telescope in either of two relatively reversed positions, and having a lens system supported in said mount in a fixed adjustment such that rays which enter parallel leave parallel, said lens system serving to modify the focal length of the lens system of the surveyor's telescope without interfering with the adjustability thereof, and said attachment serving in its respective relatively reversed positions to modify the stadia constant of said surveyor's telescope directly and inversely as the number two.

11. The combination with a surveyor's telescope having stadia wires in the focal plane of its lens system, of an attachment removably mounted on said telescope in front of the objective lens thereof, said attachment comprising a Galilean telescope having a fixed adjustment in which rays which enter parallel leave parallel, said attachment modifying the focal length of the lens system of the surveyor's telescope, while permitting full adjustability of said lens system and said attachment varying the stadia constant by the factor two.

In testimony whereof I have signed my name to this specification.

WILLARD L. EGY.

CERTIFICATE OF CORRECTION.

Patent No. 1,871,165.　　　　　　　　　　　　　　　　August 9, 1932.

WILLARD L. EGY.

It is hereby certified that error appears in the printed specification of the above numbered patent requiring correction as follows: Page 4, lines 19 and 31, claims 3 and 4, respectively, after the article "a" insert the word Galilean; and that the said Letters Patent should be read with these corrections therein that the same may conform to the record of the case in the Patent Office.

Signed and sealed this 22nd day of November, A. D. 1932.

(Seal)

M. J. Moore,
Acting Commissioner of Patents.